United States Patent [19]

Schneider, Jr.

[11] Patent Number: 5,394,325
[45] Date of Patent: Feb. 28, 1995

[54] ROBUST, EFFICIENT THREE-DIMENSIONAL FINITE-DIFFERENCE TRAVELTIME CALCULATIONS

[75] Inventor: William A. Schneider, Jr., Houston, Tex.

[73] Assignee: Exxon Production Research Company, Houston, Tex.

[21] Appl. No.: 226,420

[22] Filed: Apr. 11, 1994

Related U.S. Application Data

[63] Continuation-in-part of Ser. No. 44,352, Apr. 7, 1993, abandoned.

[51] Int. Cl.⁶ .............................................. G06F 15/20
[52] U.S. Cl. ................................................... 364/421
[58] Field of Search ....................... 364/420, 421, 422; 367/50, 53, 73

[56] References Cited

U.S. PATENT DOCUMENTS 4,964,088 10/1990 Chittineni ............................ 364/421
5,062,086 10/1991 Harlin et al. ......................... 367/73

OTHER PUBLICATIONS

*Numerical Recipes, The Art of Scientific Computing;* W. H. Press, B. P. Flannery, S. A. Teukolsky, W. T. Vetterling; Cambridge University Press pp. 95–97, 623–635, no date known.
*Anisotropic Finite-Difference Traveltimes;* J. Dellinger, Hawaii Institute of Geophysics; 61st Annual International Mtg., Society of Exploration Geophysicists, Expanded Abstracts, 1991. pp. 1530–1533.
*Finite-difference calculation of traveltimes in three dimensions;* J. E. Vidale; Geophysics, vol. 55, No. 5, (May 1990); pp. 521–526.
*Finite-Difference Calculation of Travel Times;* J. Vidale; Bulletin of the Seismological Society of America, vol. 78, No. 6, pp. 2062–2076, Dec. 1988.
*Finite difference computation of traveltimes in very contrasted velocity models: a massively parallel approach and its associated tools;* P. Podvin, I. Lecomte; Geophysics Journal International (1991) 105, 271–284.
*Upwind finite-difference calculation of traveltimes;* J. van Trier, W. W. Symes; Geophysics, vol. 56, No. 6 (Jun. 1991); pp. 812–821.
*Finite-difference traveltime maps;* A. M. Popovici, Sep.–1970.
*Accurate Finite-Difference Calculation of WKBJ Traveltimes and Amplitudes;* L. C. Pusey, J. E. Vidale; SEG Expanded Abstracts, 1991 pp. 1513–1516.
*Finite difference calculation of Green's functions;* L. Zhang, Sep.–1972.
*Encyclopedic Dictionary of Exploration Geophysics;* R. E. Sheriff; Society of Exploration Geophysicists pp. 42–43 no date known.
*Computational Fluid Mechanics and Heat Transfer;* D. A. Anderson, J. C. Tannehill, R. H. Pletcher; Hemisphere Publishing Corporation pp. 77–78, 143–144 no date known.
*Shortest path calculation of seismic rays;* T. J. Moser; Geophysics, vol. 56, No. 1 (Jan. 1991), pp. 59–67.
*Robust, efficient upwind finite-difference traveltime calculations in 3D;* W. A. Schneider, Jr.; 63rd Annual SEG meeting, Sep. 29, 1993, Washington, DC pp. 1–4.

*Primary Examiner*—Robert A. Weinhardt
*Attorney, Agent, or Firm*—Susan A. McLean

[57] ABSTRACT

Presented is a process for use in the area of geophysical data processing, for computing a three dimensional grid of traveltimes from a three dimensional grid of velocities. The process involves a finite-difference solution to the eikonal equation in spherical coordinates, with refinements which increase the stability of the calculation and cope with numerical roundoff error as well as turned ray problems. The resulting three dimensional grid is not only useful in itself in providing information regarding the subsurface, but also can be used in depth migration, velocity analysis (especially three dimensional tomography) and in raytracing (leading to modeling of synthetic seismograms, three dimensional traveltime inversion, and map migration). This method is preferably executed on a computer, and can be performed either on a mainframe or on a massively parallel processor.

17 Claims, 10 Drawing Sheets

ROBUST, EFFICIENT THREE-DIMENSIONAL FINITE-DIFFERENCE TRAVELTIME CALCULATIONS

This application is a continuation-in-part application of application Ser. No. 08/044,352, filed on Apr. 7, 1993, now abandoned.

FIELD OF THE INVENTION

The field of this invention is geophysical prospecting using seismic signals. More particularly, this invention discloses a method of seismic signal processing which yields more accurately migrated seismic signals.

BACKGROUND OF THE INVENTION

This invention is relevant to seismic data processing in the field of geophysical exploration for petroleum and minerals. The general seismic prospecting method involves transmission of elastic, or "seismic," waves into the earth and reception of reflected and/or refracted waves at the earth's surface (or, occasionally, in a wellbore) via geophones, hydrophones, or other similar devices (hereinafter referred to collectively as "geophones"). The elastic waves may be generated by various types of sources, dynamite and hydraulic vibrators being particularly common. As these waves propagate downward through the earth, portions of their energy are sent back to the earth's surface by the acts of reflection and refraction which occur whenever abrupt changes in impedance are encountered. Since these impedance changes often coincide with sedimentary layer boundaries it is possible to image the layers by appropriate processing of the signals returned to geophone groups.

Many methods of seismic data processing in use today require calculations using traveltimes to determine information regarding subsurface geology. "Traveltime" means generally the amount of time a seismic signal takes to travel from a seismic source to a subsurface reflection point to a seismic receiver. For example, the concept of migration is well known in the art. Simplistically, raw seismic data as recorded are not readily interpretable. While they show existence of formation interfaces, raw data do not accurately inform the interpreter as to the location of these interfaces. Migration, also called imaging, is the repositioning of seismic data so that a more accurate picture of subsurface reflectors is given. In order to perform the migration calculations, the seismic velocities (hereinafter referred to as "velocities") of the subsurface at a multitude of points must first be determined or approximated. These velocities are often estimated using traveltime information. Current methods of computing the traveltimes necessary to perform three-dimensional depth migration and associated velocity analyses are inefficient and/or potentially error-prone when applied to the complicated velocity models typically encountered.

There are currently two general methods of determining the grid of traveltimes needed to migrate data: the well-known ray tracing methods; and the more recently proposed methods which seek a direct solution of the eikonal equation. As is known to one skilled in the art, the eikonal equation is a form of the wave equation for harmonic waves, valid only where the variation of properties is small within a wavelength, otherwise termed "the high-frequency condition." In rectangular coordinates, the eikonal equation is as follows:

$$(\partial t/\partial x)^2 + (\partial t/\partial y)^2 + (\partial t/\partial z)^2 = S^2(x,y,z) \tag{1}$$

where the coordinate axes are x, y, and z; t is the traveltime; and S is the slowness, which is the inverse of velocity. This equation relates the gradient of traveltime to the velocity structure.

Seismic ray tracing methods are applied to determine traveltimes in most applications used commercially today. Ray tracing equations are linear, ordinary differential equations derived by applying the method of characteristics to the eikonal equation, a technique known to those skilled in the art. Ray tracing allows the determination of arrival times throughout the subsurface, by following raypaths from a source location, which raypaths obey Snell's law throughout the subsurface volume for which the velocity distribution is known. Traveltimes along the rays are then interpolated onto a three dimensional grid of the subsurface.

The ray equations may be solved with shooting methods ("shooting") or with bending methods ("bending"), as are well known to those skilled in the art. Shooting formulates the ray tracing equations into an initial-value problem, where all ray direction and position components are defined at the source location at time zero. Then the equations are recursively solved to trace the rays throughout the medium. Bending is based on Fermat's principle, which states that the seismic raypath between two points is that for which the first-order variation of traveltime with respect to all neighboring paths is zero, and attempts to locate a raypath between two points by determining a stationery traveltime path between them. It formulates the ray tracing equations into a two-point boundary value problem. Shooting is generally more efficient computationally than bending; however, both approaches present difficulties and potential inaccuracies when used to compute the gridded traveltime fields required by three-dimensional depth migration. Three-dimensional depth migration typically requires robust grids of traveltime for high quality images. As used herein, the term "robust" means a process which reliably generates accurate grids of traveltimes regardless of velocity model complexity.

Complications arise in shooting and bending calculations because each ray is computed independently of all others, and because small changes in the angle of incidence may lead to large changes in ray direction. This complication is a manifestation of the nonlinearity of the problem of ray tracing. Thus, with shooting methods, it is difficult to obtain the uniform ray coverage throughout the model that will admit traveltime interpolation onto a grid. Also, rays may cross, indicating the natural multivaluedness of wave propagation. However, when interpolating traveltimes onto a grid, one may not interpolate between different branches of a multivalued wavefront, hence a "smart" interpolation, that is, an interpolation geared to adjust its parameters based upon conditions at various locations within the grid, is necessary for a multivalued wavefront. Unfortunately, a "smart" interpolation is a difficult task in three dimensions.

Ray shooting itself is quite efficient, but a robust application using it to compute grids of traveltimes may not be efficient. While the bending method will determine a raypath to any point in the grid, it is subject to local, instead of global, minimization, resulting in traveltime errors. Bending is also inefficient for determining three dimensional grids of traveltimes.

An alternative to ray tracing is to solve the three dimensional eikonal equation directly, using numerical techniques. This method was proposed in Vidale, J. E., "Finite-difference Calculation of Traveltimes in Three Dimensions," *Geophysics*, vol. 55, pp. 521-526 (1990), Vidale succeeded in calculating a grid of traveltimes with a finite-differencing scheme based on the rectangular version of the eikonal equation as set forth above in Equation (1), which scheme makes a plane-wave approximation, a simplifying assumption which introduces error into the calculation. An alternative to Vidale's method was proposed in Podvin, P. and LeComte, I., "Finite-difference Computation of Traveltimes in Very Contrasted Velocity Models: a Massively Parallel Approach and its Associated Tools," *Geophys. J. Int.*, vol. 105, pp. 271-284 (1991), which also makes a plane-wave approximation, which approximation is not used in the method of the present invention. This alternative constitutes a finite-difference approximation of Huygens principle. Huygens principle holds that every point on the boundary of a "cell," wherein a plurality of these cells define a subsurface grid, acts as a secondary source emitting an impulse at the moment it is reached by the first wave arrival.

These algorithms do not vectorize or parallelize at the loop levels. This means that these algorithms are not set up to contain "independent" nested iterations of calculations or "loops". A vectorizable algorithm contains single unnested do loops whose iterations may be computed in any order (thus they are independent). A vectorizable and loop parallelizable algorithm contains doubly nested do loops, whose iterations are independent of one another. The inner loop vectorizes and the outer loop parallelizes. Vector loops may be executed very efficiently on any one processor of a vector computer, while parallel loops may be executed efficiently by multiple processors on a parallel computer. A CRAY ™ Y-MP is an example of such a machine.

The two-dimensional graph theory approach of Moser, T. J., "Shortest Path Calculation of Seismic Rays," *Geophysics*, vol. 56, pp. 59-67 (1991), extends to three dimensions; however, this approach, also a Huygens principle method, is also inefficient.

Van Trier, J. and Symes, W. W., "Upwind Finite-Difference Calculation of Traveltimes," *Geophysics*, vol. 55, pp. 521-526 (1991), drew upon fluid dynamics technology and presented a two dimensional upwind (meaning only traveltimes at points in the direction of the negative traveltime gradient, with respect to the current calculation point, are used in the determination of the traveltimes) finite-difference traveltime calculation technique that fully vectorizes, and Popovici, A. M., "Finite-difference Traveltime Maps," Stanford Exploration Project Report vol. 70, pp. 245-256 (1991), presented the extension of the Van Trier and Symes method to three dimensions, while conceding that the algorithm was unstable. The three dimensional algorithm radially extrapolates the three components of the slowness vector (where slowness is the inverse of velocity), i.e., $\partial t/\partial r$, $(1/r)\partial t/\partial \theta$, and $(1/[r \sin \theta])\partial t/\partial \phi$, in a spherical coordinate system, where t = traveltime;

r = the radius from the origin point of the spherical coordinate system to the point of interest;

$\theta$ = the angle that the z-axis makes with the radial line connecting to the point of interest; and $\phi$ = the angle from the x axis to a projection of the radial line onto the x-y plane.

While the efficiency of Popovici's algorithm makes it attractive, it is, as Popovici conceded, unstable. It is particularly unstable and inaccurate when applied to the highly variable velocity fields encountered in three-dimensional depth migration applications. Popovici, "Stability of finite-difference traveltime algorithms," Stanford Exploration Project Report, vol. 72, pp. 135-138 (1991), presented a geometrical derivation of the Courant-Friedrichs-Lewy (CFL) stability condition for the two dimensional method. However, no one has been able to improve the Popovici three-dimensional solution so as to remove its inherent instabilities.

SUMMARY OF THE INVENTION

This invention concerns the calculation of a grid of traveltimes. Such a grid is necessary for integral-type migration of seismic data, as is known to those skilled in the art. The invention constitutes a method of computing this necessary grid of traveltimes of a subsurface volume. One starts with a three dimensional rectangular (i.e., x, y, and z coordinates) grid of velocities of said subsurface volume, then uses a finite-difference solution (comprising a set of finite difference equations) of the eikonal equation in three-dimensional spherical coordinates. The method comprises added stabilization by: a) use of finite difference equations with unitless amplitude factors, and b) implementation of an adaptive radial step process.

Other embodiments of this invention add further stabilization to the traveltime calculations, as discussed more thoroughly herein. Such additional embodiments include adding one or more of the following: (a) rotation of the spherical coordinate system in which the computations are performed, resulting in better accuracy and efficiency; (b) minimizing the impact of backward propagating wavefronts, or turned waves, which are discussed later, by enforcing that $\partial t/\partial r$ is always greater than zero and implementing a minimum allowed $\Delta r$ step in the finite-difference computation; (c) formulation of a continuous slowness model for mapping from rectangular to spherical coordinates with interpolation; (d) ensuring this slowness interpolation is not aliased by requiring the spherical grid never to be more coarsely sampled than the rectangular grid of velocities from which it is derived; (e) ensuring the slowness model is sufficiently smooth to satisfy finite-differencing theory and to permit interpolation;, and (f) particularly for small to medium values of r, using adaptive angular sampling of $\Delta \theta$ and $\Delta \phi$ at each radial step to improve the accuracy and efficiency of the calculations.

It is an object of this invention to increase the stability, accuracy and efficiency of the three-dimensional upwind finite-difference traveltime calculation of Popovici.

It is a further object of this invention to apply this method of calculating a traveltime grid to three dimensional depth migration applications.

It is a further object of this invention to present an algorithm useful for obtaining subsurface velocity information for depth migration.

It is a further object of this invention to propose that the methods of the calculation of a three-dimensional grid of traveltimes in isotropic media can be extended to anisotropic media.

It is a further object of this invention to provide a method of calculating a three dimensional grid of traveltimes which may be implemented on either a single CPU or on a massively parallel computer.

It is a further object of this invention to present a method for easily constructing wavefronts and ray paths from three dimensional grids of traveltimes, which wavefronts and ray paths are useful in modeling and data interpretation applications.

Other objects of this invention will be apparent to one skilled in the art upon review of the specification, Figures, claims, and abstract herein.

DESCRIPTION OF THE PREFERRED EMBODIMENTS

It is more efficient to compute the traveltimes of signals from a source in spherical coordinates rather than in rectangular coordinates because wave fronts are naturally more spherical in shape than they are rectangular. This invention starts with an existing set of three-dimensional finite-difference eikonal equations in spherical coordinates, as proposed by Popovici, which equations have a reputation for being unstable and unsuitable for modeling wave propagation in complex geological media. This invention modifies these equations to be stable to roundoff error, and presents the necessary stability criteria for computations using the equations and the necessary criteria for accurate smoothing and interpolation of the three dimensional slowness model. This invention also proposes the optimal coordinate system in which to solve the equations. The method can be used to accurately compute traveltimes necessary for three dimensional seismic imaging, even when the slowness field is complicated enough to cause turned waves, which are discussed later.

Presented is a robust, efficient and stable implementation of the three dimensional finite-difference solution of the eikonal equation. This implementation involves modification of the original equations proposed by Popovici, deriving various stability criteria and solving the problem, preferably in a rotated spherical coordinate system, as more thoroughly described herein. This implementation performs well on the high-contrast, complex velocity models frequently encountered by current three dimensional depth migration applications. It is expected that the algorithmic methods disclosed herein would be run on a computer in the best mode. As would be recognized by one skilled in the art, this implementation completely vectorizes at the inner-loop level and completely parallelizes at the outer-loop level. For a target-oriented three dimensional migration approach, the algorithm permits implementation so as to require little memory beyond that needed to store the velocity model in rectangular coordinates.

Figure 1A:
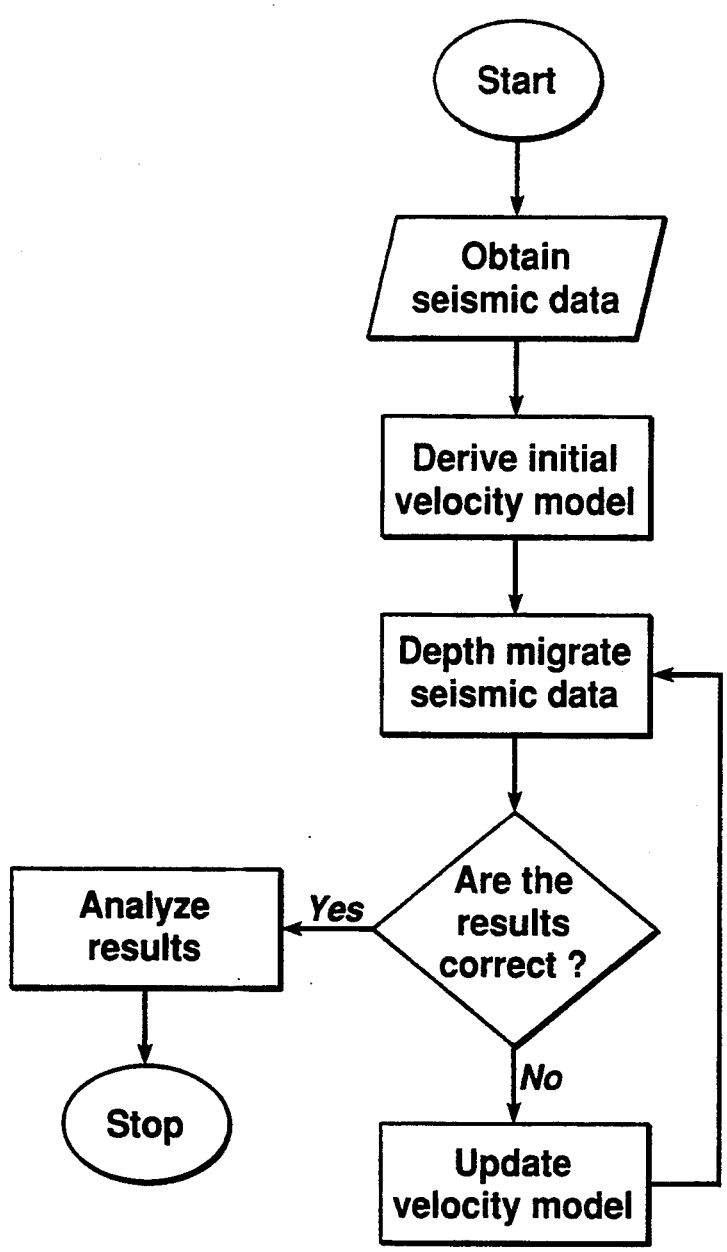
FIG. 1A is a general flowchart of the typical method of geophysical data processing.
Figure 1B:
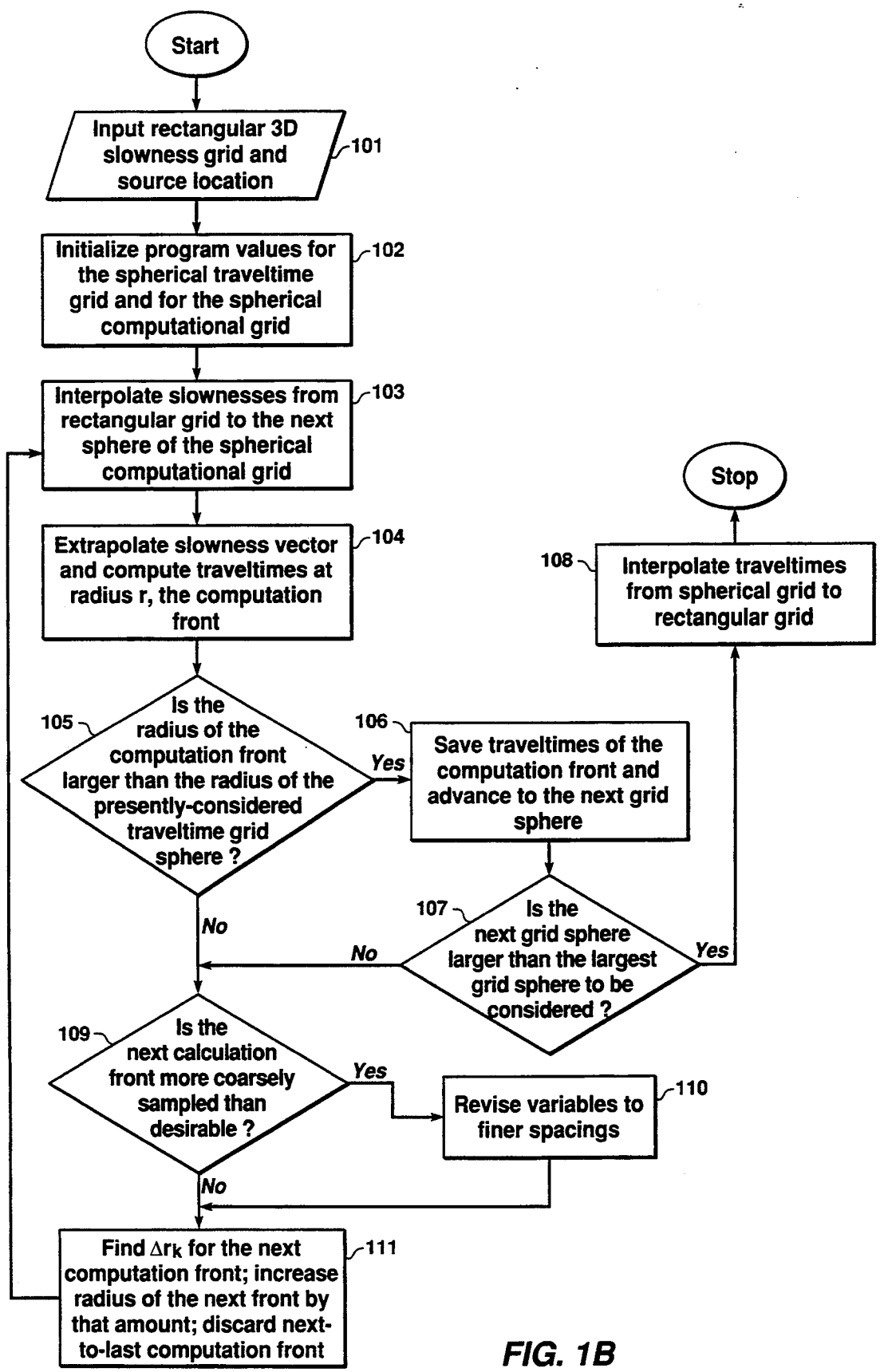
FIG. 1B is a general flowchart outlining the steps of the method of this invention.
Figure 1C:
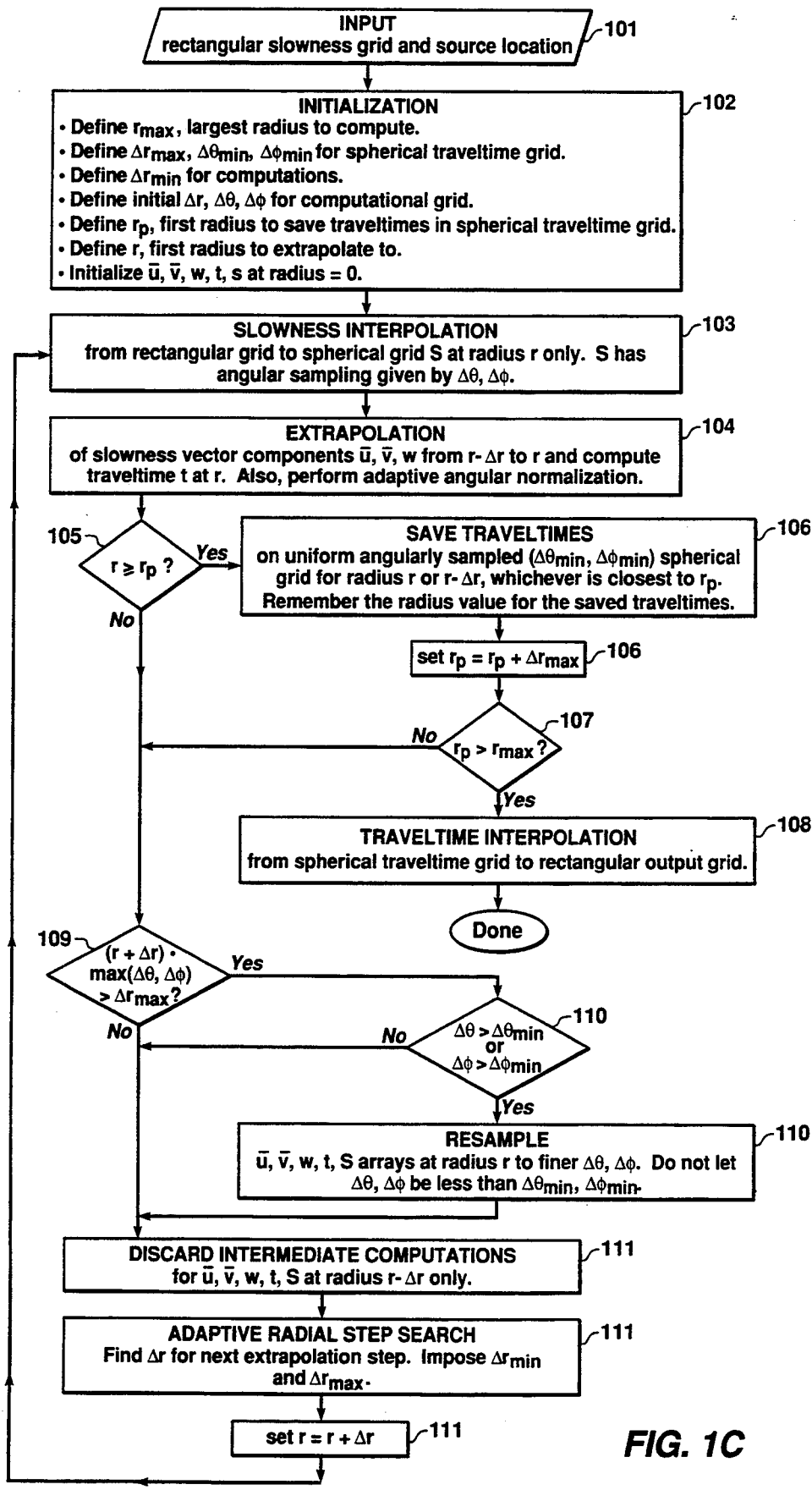
FIG. 1C is a detailed flowchart corresponding to FIG. 1B.

The invention can be more easily understood by referring to the flowcharts FIGS. 1A, 1B, and 1C. FIG. 1A is a general overview of a typical seismic data processing technique. FIG. 1B is a general flowchart of the invention, and FIG. 1C sets forth the preferred embodiment. Discussion of FIG. 1C is implicit in the detailed mathematical analysis which follows the general flowchart discussion.

As shown in FIG. 1A, generally one starts with seismic data, then derives an initial velocity model—that is, a mathematical model which represents the subsurface velocities. One then uses this velocity model in performing a depth migration of the data, a technique which is known to those skilled in the art of geophysical data processing. After this depth migration, the practitioner examines the data to determine whether it appears consistent with what is known about the subsurface. If it is, the data are then analyzed. If not, he or she may perform a velocity model update; that is, a refining of the velocity model, so as to produce a better migrated depth image of the subsurface.

There are various portions of the general procedure set forth in FIG. 1A which may benefit from the present invention. Either one of the two velocity modeling steps may use this invention; additionally, this invention may be used in the depth migration step or in analyzing the data. These and other uses of the within invention would be obvious to one skilled in the art of geophysical data processing.

As set forth above, this technique is a method for computing a three dimensional grid of traveltimes from a three dimensional grid of velocities. The general steps involved in this technique are set forth in FIG. 1B. The starting point assumes that one has a rectangular three dimensional grid of subsurface velocities, expressed in slowness form, plus the source location.

Because the radial increment in the calculation of traveltimes varies due to the adaptive aspect of the finite-difference model, and a uniform grid of traveltimes is desirable, the method performs calculations on a non-uniform grid (the computational grid) and saves only those traveltimes at reasonably uniform intervals (the traveltime grid). That is, the goal is to have a reasonably uniform three dimensional grid. However, the finite difference calculations do not yield a uniform grid because the radial increment ($\Delta r$) varies as the distance from the source grows. Accordingly, many of the "fronts" calculated by the finite difference equation are discarded. The ones remaining are written onto a reasonable uniform grid for later interpolation to rectangular coordinates. These two types of spherical grids used in this method are referred to herein as the "computation grid," which is the grid on which calculations are performed, and the "traveltime grid," the more coarsely sampled grid where traveltimes are stored for later use. Obviously, then, the traveltime grid is a subset of the computation grid. For clarity, it should be pointed out, as is explained later, that the entire computation grid is never stored; at most only the two most recent spheres or "fronts" are kept in the computation grid at any time in the calculation. However, certain of these "computation fronts" are stored in the traveltime grid; all of those fronts are retained.

Initial conditions are set; first, the target spherical grid into which pertinent traveltimes will be saved, and second, independent grid conditions for the advancing spherical computational fronts:

(a) The distance from the source to the outermost traveltime grid sphere at radius $r_{max}$ is determined by selecting that corner in the hexahedron defined by the given rectangular grid, which corner is the farthest from the source. The value for $r_{max}$ will be equal to the distance from the source to that farthest corner.

(b) The incremental radial and angular values for the traveltime grid to be saved, $\Delta r_{max}$, $\Delta \theta_{min}$, and $\Delta \phi_{min}$, are set. The incremental radius will be set equal to the minimum grid spacing in the rectangular grid, whether it is in the x, y or z direction. Mathematically, $\Delta r_{max} = \min(\Delta x, \Delta y, \Delta z)$. The incremental angles are set equal to said minimum grid spacing divided by $r_{max}$.

(c) The maximum radial increment for the computation fronts is set to the smallest spacing in the rectangular grid, to ensure the computations will not occur on a coarser scale than that found in the rectangular grid. The minimum radial increment is then set at some fraction of $\Delta r_{max}$. It has been found by experiment that $\Delta r_{min} = 0.1 \Delta r_{max}$ gives good results. Larger fractions increase error, while smaller fractions reduce efficiency of the calculation.

(d) The initial radial and angular increments $\Delta r$, $\Delta \theta$, and $\Delta \phi$ are set for the first extrapolation step. The initial radial increment is set to nine-tenths of $\Delta r_{max}$, while the angular increments are set to roughly 0.1 radians, as a result of a calculation set forth later, in Equation 34 herein.

(e) The value for the radius of the first sphere of the traveltime grid to be saved, $r_p$, is set to equal the incremental constant, $\Delta r_{max}$.

(f) The initial conditions for all the variables at the location of the source are set.

After the initialization steps, the slownesses are interpolated from the rectangular grid to the spherical computation grid at the first radius. The three components of the slowness vector at the initial radius are then extrapolated to the new radius (via an advancing calculation front) and the traveltime t is computed for each point on the calculation front at the new radius. After the calculations for the new radius, the radius of the new front and that of the immediately previous front are checked against the spherical traveltime grid to determine whether a sphere within this traveltime grid is located between these two spherical computation fronts. If not, neither front is saved. If a sphere from the spherical traveltime grid is located between the two fronts, then two steps are possible, only the latter of which is depicted in FIG. 1B. First, an interpolation could be completed to determine the traveltimes at the exact radius, $r_p$, in the spherical traveltime grid. Second, and preferably, the grid loses its uniformity by simply saving the computation front closer to the grid sphere as the actual grid sphere saved. The true radius of this computation front is also saved for the subsequent interpolation to rectangular coordinates. This is more efficient than interpolating to the originally defined grid, and introduces no error since the traveltimes will ultimately be interpolated back to rectangular coordinates.

As the computation fronts advance, there are checks on each front to ensure that the spherical grid spacings never become coarser than the spacings in the rectangular grid of slownesses used as the starting point. If it appears that coarser spacing would result in the next computation front, the angular spacings $\Delta \theta$ and $\Delta \phi$ are adjusted to smaller numbers to produce a finer grid. This adjustment is characteristic of this method, called "adaptive angular sampling." This is done for $\Delta \theta$ until $\Delta \theta = \Delta \theta_{min}$, after which this check is no longer performed, and likewise for $\Delta \phi$ until $\Delta \phi = \Delta \phi_{min}$. The previous computation front is discarded since the method requires at most two computation fronts at any given instance.

An adaptive radial step search is then performed to determine the value of the next $\Delta r$ and, accordingly, the radius of the next computation front. The process returns to the slowness interpolation step and this process continues.

The computation is complete when the computation front reaches or exceeds $r_{max}$. At that point, the traveltime interpolation step is entered. The spherical grid of traveltimes is interpolated to a rectangular grid, using techniques know to those skilled in the art.

FIG. 1C exactly tracks the flowchart of FIG. 1B, but presents the same modules in more mathematical terms. Corresponding steps have the same numbers; thus, it can be seen that input step 101 of FIG. 1A is the same as input step 101 of FIG. 1B, and so on.

Having examined the technique of this invention in broad terms, a more rigorous mathematical analysis is now presented.

Discussion herein focuses first on the derivation of the finite-difference solution of the three dimensional eikonal equation in spherical coordinates, including the modified finite difference equations which reduce numerical roundoff error.

The starting point is the eikonal equation, which is derived by making a high-frequency assumption on the wave equation. The eikonal equation (see Equation 1) in three dimensional spherical coordinates is as follows:

$$\left(\frac{\partial t}{\partial r}\right)^2 + \left(\frac{1}{r}\frac{\partial t}{\partial \theta}\right)^2 + \left(\frac{1}{R \sin\theta}\frac{\partial t}{\partial \phi}\right)^2 = S^2 \quad (2)$$

where t denotes traveltime and S denotes slowness, which is the inverse of velocity, thus having units of time/distance. Popovici's extension of Van Trier and Symes' two dimensional solution is obtained by first defining $$w = \partial t/\partial r; \quad (3)$$

$$u = \partial t/\partial \theta; \quad (4)$$

$$v = \partial t/\partial \phi, \quad (5)$$

and noting that the mixed partial differential equations satisfy the following:

$$\partial u/\partial r = \partial w/\partial \theta; \quad (6)$$

$$\partial v/\partial r = \partial w/\partial \phi. \tag{7}$$

As shown by Popovici, and as would be known by one skilled in the art, these two equations may be written in finite difference form as $$u(r+Dr,q,f) = u(r,q,f) + (Dr/Dq)D_q w(r,q,f) \tag{8}$$

$$v(r+Dr,q,f) = v(r,q,f) + (\Delta r/\Delta\phi)\Delta_{100} w(r,q,f) \tag{9}$$

As discussed by Popovici and van Trier and Symes (Van Trier, J. and Symes, W. W., "Upwind Finite-Difference Calculation of Traveltimes," *Geophysics*, vol. 55, pp. 521-526 (1991); Popovici, A. M., "Finite-difference Traveltime Maps, Stanford Exploration Project Report vol. 70, pp. 245-56 (1991)), the $\Delta w$ factors (i.e., $\Delta_\theta w$ and $\Delta_\phi w$) are computed with the Engquist-Osher differencing scheme. This scheme is set forth in more detail in these two references, which are incorporated herein by reference. 10 Once u and v have been extrapolated to the new radius with these equations, Popovici computed w at the new radius with the eikonal equation as $$w(r + \Delta r, \theta, \phi) = \tag{10}$$

$$\left[ s^2(r + \Delta r, \theta, \phi) - \frac{u^2(r + \Delta r, \theta, \phi)}{(r + \Delta r)^2} - \frac{v^2(r + \Delta r, \theta, \phi)}{(r + \Delta r)^2 \sin^2\theta} \right]^{\frac{1}{2}}$$

and traveltime, t, was calculated by integrating w in the radial direction as $$t(r+Dr,q,f) = t(r,q,f) + (Dr/2)[w(r+Dr,q,f) + w(r,q,f)] \tag{11}$$

These equations completely vectorize and parallelize when placed within the doubly nested loops that range over all $\theta$ and $\phi$; however, the amplitude factors $\Delta r/\Delta\theta$ and $\Delta r/\Delta\phi$ in the finite-difference equations are not unitless, and are generally large. This amplifies roundoff errors, which may lead to numerical instability. The invention taught herein recasts the equations into a more stable form by defining $$\bar{u} = u/r \tag{12}$$

$$\bar{v} = v/r, \tag{13}$$

then computing the mixed partials as $$\partial \bar{u}/\partial r = (1/r)(\partial u/\partial r) - (u/r^2) = (1/r)(\partial w/\partial \theta) - (\bar{u}/r) \tag{14}$$

$$\partial \bar{v}/\partial r = (1/r)(\partial v/\partial r) - (v/r^2) = (1/r)(\partial w/\partial \phi) - (\bar{v}/r) \tag{15}$$

These mixed partials are then written in finite-difference form as $$\bar{u}(r + \Delta r, \theta, \phi) = \left( \frac{r - \Delta r}{r} \right) \bar{u}(r,\theta,\phi) + \left( \frac{\Delta r}{r\Delta\theta} \right) \Delta_\theta w(r,\theta,\phi) \tag{16}$$

$$\bar{v}(r + \Delta r, \theta, \phi) = \left( \frac{r - \Delta r}{r} \right) \bar{v}(r,\theta,\phi) + \left( \frac{\Delta r}{r\Delta\theta} \right) \Delta_\phi w(r,\theta,\phi) \tag{17}$$

The corresponding amplitude factors in these equations are unitless, and easily kept near unity, which makes these equations more stable to accumulatory roundoff error. After extrapolation of the angular components, the radial component is computed with the corresponding eikonal equation as $$w(r + \Delta r, \theta, \phi) = \tag{18}$$

$$\left[ S^2(r + \Delta r, \theta, \phi) - \bar{u}^2(r + \Delta r, \theta, \phi) - \frac{\bar{v}^2(r + \Delta r, \theta, \phi)}{\sin^2\theta} \right]^{\frac{1}{2}}$$

and the traveltime is computed by integrating w in the radial direction, as in equation (11).

This invention presents the Courant-Friedrichs-Lewy ("CFL") stability conditions for the new finite-difference equations. The von Neumann or Fourier method (well known to those skilled in the art) was used in two dimensions on linearized versions of Equations 16 and 17. The stability conditions being $$\frac{|\bar{u}|}{|w|} \frac{\Delta r}{r\Delta\theta} \leq \frac{1}{4}(1 + \alpha) \tag{19}$$

$$\frac{|\bar{v}/\sin\theta|}{|w|} \frac{\Delta r}{r|\sin\theta|\Delta\phi} \leq \frac{1}{4}(1 + \alpha) \tag{20}$$

where $\alpha = (r - \Delta r)/r$.

Setting $\alpha = 1$ in equations (19) and (20) gives the stability criteria governing Popovici's original equations, (8) and (9) herein. These stability conditions govern the allowed r, $\theta$ and $\phi$ sampling, so that the domain of dependence of the finite-difference equations will not be smaller than that of the differential equations that they approximate. (A more rigorous explanation of the stability analysis method is found in Press, W. H., Flannery, B. P., Teukolsky, S. A., and Vetterling, W. T., *Numerical Recipes: The Art of Scientific Computing*, pages 623-635, which is incorporated herein by reference.) For fixed angular sampling, these conditions dictate how the radial step must be adaptively determined. After each extrapolation step, the $\Delta r$ for the next step is determined by examining these inequalities exhaustively, for all $\theta$ and $\phi$, then selecting the largest $\Delta r$ value that satisfies the inequalities everywhere. The exhaustive search must be performed efficiently, as it constitutes as many computations as does the actual extrapolation.

The efficient adaptive step search of this invention is as follows, explained using only Equation 19 as an example. The explanation is analogous for Equation 20 and therefore is not repeated. The CFL stability conditions (Equation 19) allow enormous steps when $|\bar{u}|$ is infinitesimal, which would result in large amplitude factors in the finite-difference equations if honored (because $\Delta r/r\Delta\theta >> 1$), so before the search begins after the $k^{th}$ radial extrapolation step, the best mode of the invention forces that the next step be no larger than $$\Delta r_{opt} = \min\{\Delta r_{max}, 2r\Delta\theta\} \tag{21}$$

where $\Delta r_{max}$ is the global maximum imposed on the radial step as explained earlier and $r\Delta\theta$ is arc-length in the $\theta$ direction. Thus, this initial imposition bounds the amplitude factors within the finite-difference equations by 2. The factor, 2, gives good results. As would be obvious to a practitioner of the art, this constant could be varied with commensurate loss of efficiency or accuracy. The radial step candidate is then initialized to this predefined local ceiling, $$\Delta r_{new} = \Delta r_{opt}. \tag{22}$$

The CFL inequality for Equation 19 may be rewritten as $$\frac{2\Delta r_\theta}{r\Delta\theta}|\bar{u}| \leq |w| \tag{23}$$

Substituting the value of the local step ceiling, $\Delta r_{opt}$, for $\Delta r_\theta$, and arranging the inequality into the form of a binary operator yields $$b = 0.5 + 0.5 \times \text{sgn}\left( |w| - \frac{2\Delta r_{opt}|\bar{u}|}{r\Delta\theta} \right), \tag{24}$$

where sgn is the sign function, and if $b=1$, the full step, $\Delta r_{opt}$, may be taken, but if $b=0$, a restricted step must be calculated with the CFL inequality. Once the binary operator has been computed for a given $\theta$, $\phi$ pair, the radial step candidate is updated efficiently for either case with $$\Delta r_{new} = \min\left\{ \Delta r_{new}, b\Delta r_{opt} + \frac{(1-b)r\Delta\theta|w|}{2\max[|u,\epsilon|]} \right\} \tag{25}$$

where $\epsilon$ is a small positive number (it has been found by experiment that $1\times 10^{-5}$ works well, but generally any number sufficiently small so as not to interfere with the values of $\Delta r_{new}$ is acceptable) used to prevent division by zero. New radial step candidates are always compared with the current value and the smallest step is always retained, as indicated, in this equation. The above two equations, along with the two counterparts from the CFL condition involving $\bar{v}$ are evaluated exhaustively for all $\theta$ and $\phi$ at radius r. The associated double loop over $\theta$ and $\phi$ vectorizes and parallelizes with the adaptive search equations written in this manner. Once done with both loops a minimum radial step condition is also enforced, as is discussed later, to define the next radial step which will be taken, $$\Delta r = \max\{\Delta r_{new}, \Delta r_{min}\}. \tag{26}$$

The velocity model is generally derived and constructed in rectangular coordinates and is presented to the traveltime calculation program in slowness form. The traveltime calculation program of this invention interpolates slownesses from rectangular to spherical coordinates, preferably with trilinear interpolation, a method known to those skilled in the art of numerical analysis, as they are needed. See Press et al. at pages 95–97. The source is placed at the origin in the spherical coordinate system, and initial conditions are defined for $r=0$ as $$\bar{u}(r=0,\theta,\phi)=0 \tag{27}$$

$$\bar{v}(r=0,\theta,\phi)=0 \tag{28}$$

$$w(r=0,\theta,\phi)=S(r=0,\theta,\phi) \tag{29}$$

$$t(r=0,\theta,\phi)=0 \tag{30}$$

Slownesses are interpolated everywhere on the sphere defined by $\Delta r,\theta,\phi$, then $\bar{u}$ and $\bar{v}$ are extrapolated to radius $\Delta r$ with the finite-difference equations and w is computed at the new radius with the eikonal equation, and t is also computed by integrating w. The adaptive step conditions are then searched exhaustively to determine the $\Delta r$ that will be used for the next step. Once done, the procedure repeats, and so on, until the preset maximum radius, $r_{max}$, has been reached. Complete information from only the current radius and the previous radius are retained in core memory of the computer at any given time, and traveltimes are interpolated and saved at uniform radial increments given by $\Delta r_{max}$.

Specifically, if the next radius for which traveltimes need to be saved is $r_{next}$, then, as previously discussed, after extrapolation has been performed to the radius $r+\Delta r$ if $r \leq r_{next} \leq r+\Delta r$ then traveltimes are saved for radius r or $r+\Delta r$, whichever is closest to $r_{next}$, and the exact radius is also saved for the subsequent interpolation from spherical to rectangular coordinates Once the extrapolation has completed, traveltimes are interpolated from the uniform spherical grid onto a rectangular grid for output. Trillnear interpolation is preferable for this step. When the objective is target-oriented migration, a technique known to those of reasonable skill in the art, one or more vertical image-plane(s) of traveltimes are desired from the entire three dimensional volume. The algorithm may then be written to avoid storage of the large three dimensional spherical traveltime volume, by precomputing, and storing, the radii to all points within the target planes. The traveltimes within these planes are interpolated adaptively and stored as the extrapolation spheres overlap each point. This method is particularly powerful in that it dramatically reduces computer storage required; that is, the entire spherical grid of traveltimes is not stored, but only the traveltimes at the locations desired. This approach can then be generalized to calculate all traveltimes in the subsurface volume, hence the desired rectangular grid, while using much less computer storage space. This is the preferred embodiment of the within invention.

Any finite-difference solution to a differential equation cannot accurately model small wavelength components of the solution, which are on the order of several grid spacings. For that reason, the rectangular slowness model must be sufficiently smooth for the given spherical grid spacings. Small wavelength slowness components, if present, will be nonlinearly introduced into the solution as noise (by the eikonal equation), causing errors in the calculated traveltime field.

Thus, a minimum condition for high-fidelity modeling is to taper smoothly the slowness grid so that its Fourier transform is attenuated by about 20 dB at the maximum (Nyquist) wavenumbers, $1/\{2\Delta x\}$, $1/\{2\Delta y\}$ and $1/\{2\Delta z\}$, in the x, y and z directions respectively, with smoothing. The number twenty gives good results but, as would be obvious to a practitioner of the art, could be varied with commensurate losses in accuracy. More severe tapering may be mandated by complicated, high-contrast models. This implies that small grid spacings (30–60 m) will be required to maintain the large dynamic range present in certain complicated slowness models (such as those containing salt-sediment interfaces), thus insuring that smoothing will be adequate without significantly altering the model. The trilinear interpolation mapping from rectangular to spherical coordinates is appropriate because it makes the slowness model continuous in all spatial directions. However, care must also be taken that the interpolation is not aliased, as would be recognized by one skilled in the art, which would introduce small wavelength slowness errors that translate directly into traveltime errors. With the smoothness criteria defined above, this implies that the spherical grid spacings must not exceed those in the rectangular grid.

Angular distances along grid cell edges within the spherical grid are measured in arc-lengths. The nonuniform scale factors governing the spherical coordinate system cause arc-lengths (and the size of grid cells) to increase proportionally to r. The nonuniform sized grid cells suggest a nonuniform sampling scheme. The criterion to avoid aliasing the rectangular to spherical slowness interpolation is that grid cells within the spherical grid may never be larger than those within the rectangular slowness grid. Thus, for a maximum radius, $r_{max}$, and for the minimum sampling in the rectangular grid, $h_{min} = \min\{\Delta x, \Delta y, \Delta z\}$, we may determine the maximum allowed radial sample interval as $\Delta r_{max} = h_{min}$ and the associated minimum number of necessary radial steps, nr, as $$nr = int\{r_{max}/\Delta r_{max}\} + 1 \qquad (31)$$

The minimum angular sampling that will be required will occur at the maximum radius. The arc-length formula gives this as $\Delta\theta_{min} = \Delta\phi_{min} = h_{min}/r_{max}$, with associated maximum number of angular samples being $$n\theta_{max} = n\phi_{max} = int\{\pi/\Delta\theta_{max}\} + 1 \qquad (32)$$

for a grid that represents a hemisphere, with its flat edge corresponding to the plane z=0. Note that it is not required to compute traveltimes for those portions of the hemisphere not contained within the rectangular grid, and that thus the algorithm could be modified to ignore those portions, using techniques known to those skilled in the art. The best mode of this invention neglects those portions, thus saving roughly half the computational time.

Equal $\theta$ and $\phi$ spacings are used here to simplify this discussion, but it is not required in practice. For small radii, this angular sampling implies that $r\Delta\theta_{min} << h_{min}$, which is supersampling (i.e., oversampling or sampling too finely) in the angular directions with regard to the radial direction. While this is obviously inefficient because $n\theta$ and $n\phi$ are much larger than necessary, it may also cause errors, as discussed in Press et al. at page 631. The most efficient and safest implementation uses fully adaptive sampling in r, $\theta$ and $\phi$, that is, adaptive radial sampling and adaptive angular sampling, where an attempt is made to keep the cellular arc-lengths close in size h to $h_{min}$. The method of this invention begins with a minimum number of angular grid samples, $$n\theta = n\phi = C. \qquad (33)$$

The number C is arbitrarily selected to be an integer constant between about 20 and about 50, preferably between 25 and 35, more preferably 31, which has been shown by experiment to give good results. The larger the number, the more inefficient the calculation; the smaller the number, the more prone to error are the results. Also calculated at this point are corresponding sample intervals of $$\Delta\theta_{min} = \Delta\phi_{min} = \pi/(n\theta - 1), \qquad (34)$$

assuming a hemispherical grid. Next, after each extrapolation step, if $$(r + \Delta r_{max})\Delta\theta_{min} > h_{min}, \qquad (35)$$

$$(r + \Delta r_{max})\Delta\phi_{min} > h_{min}, \qquad (36)$$

then, using adaptive angular sampling, the angular sampling is scaled down as $$\Delta\theta_{min} = \Delta\phi_{min} = Kh_{min}/r, \qquad (37)$$

where K is a constant between 0 and 1, preferably between 0.5 and 1, more preferably 0.8, which has been shown by experiment to give good results. Then, new values for $n\theta$ and $n\phi$ are computed, and all entities S, $\bar{u}$, $\bar{v}$, w and t are resampled at their respective radii, using interpolation in two dimensions, preferably second order LaGrange interpolation. Each time this resampling occurs the $n\theta$ and $n\phi$ parameters become larger, so once they attain their preset maximum values, the resampling option is terminated. This completely adaptive angular and radial sampling increases efficiency and accuracy, while allowing strict obedience of the CFL stability conditions.

Figure 2:
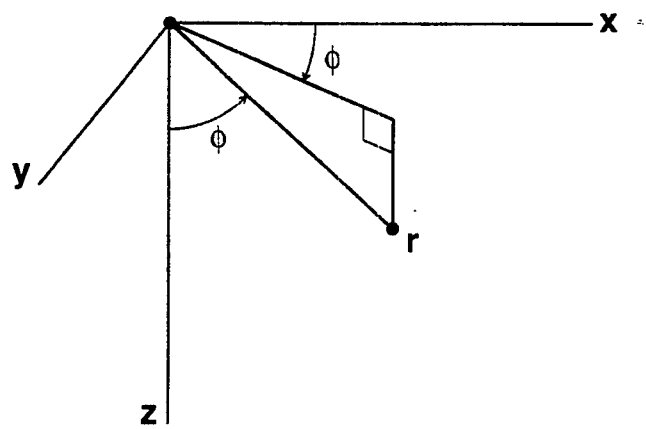
FIG. 2 depicts the traditional orientation of x, y and z axes for translation to spherical coordinates.
Figure 3:
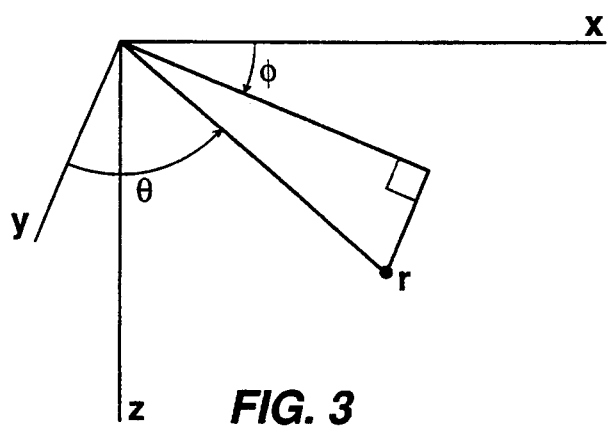
FIG. 3 depicts the orientation of the x, y and z axes for translation to spherical coordinates, after rotation as taught by the method of this invention.

The finite-differencing will be performed in spherical coordinates on a discrete grid, where the source point is placed at the origin. In the standard textbook spherical coordinate system, as shown in FIG. 2, $\theta$ is measured entirely within a vertical plane, and $\theta = 0$ occurs on the positive z-axis, while $\phi$ is measured entirely within a horizontal plane, and $\phi = 0$ occurs on the positive x axis. Since arc-length in the $\phi$ direction has sine dependency, grid cells throughout the spherical volume will be smallest directly beneath the source, since the entire $\phi$ axis is confined to a point when $\theta = 0$, along the z axis. The adaptive radial step is always proportional to arc length in the angular directions (see Equations 19 and 20), so when the traveltime field becomes complicated directly beneath the source, then infinitesimal radial steps will be mandated. This effectively destroys efficiency since run-time depends proportionally on the number of radial steps taken. Also, the z axis corresponds to an "edge" where $\theta = 0$, within the spherical coordinate system. The robust Engquist-Osher differencing scheme cannot be used here. Instead a less accurate, one sided difference formula must substitute because of edge conditions, as would be appreciated by one skilled in the art. A complicated wavefront impinging upon this location may thus be treated improperly, resulting in extrapolation errors in a very important part of the grid. These situations may be avoided by changing the coordinate system. This invention performs the finite-differencing within a discrete rotated spherical coordinate system, which is illustrated in FIG. 3, and which has the transformation from spherical to rectangular coordinates, as would be recognized by one of reasonable skill in the art, given by $$x = r\sin\theta\cos\phi \qquad (38)$$

$$y = r\cos\theta \qquad (39)$$

$$z = r\sin\theta\sin\phi. \qquad (40)$$

Because of this rotation, the $\phi$ axis is now confined to a point along the y-axis, where z=0, i.e., substantially on the surface. This is the region where the wave field is best-behaved and usually consists of a simple direct-arrival event. Large cells exist everywhere in the subsurface, where the wave field is expected to be complicated, so the largest possible adaptive radial steps will be taken. None of the related art rotates the spherical coordinate axes like this; instead, the z-axis, and thus the zone of lowest accuracy, typically extends directly below the source. As is obvious to those of reasonable skill in the art, one would not want the zone of lowest accuracy directly below the source because that is the region of greatest interest, which may contain complex structures. The rotation of these axes may be envisioned by noting that in both versions, r is the distance from the source to the point in question (the line connecting the source to said point being called a "radial line"). In the first, commonly used version, $\phi$ is the angle from the x axis to the projection of the radial line to the x-y plane and $\theta$ is the angle from the z axis to the radial line. Under the within method, $\phi$ is the angle from the x axis to the projection of the radial line into the x-z plane and $\theta$ is the angle from the y axis to the radial line.

Figure 4:
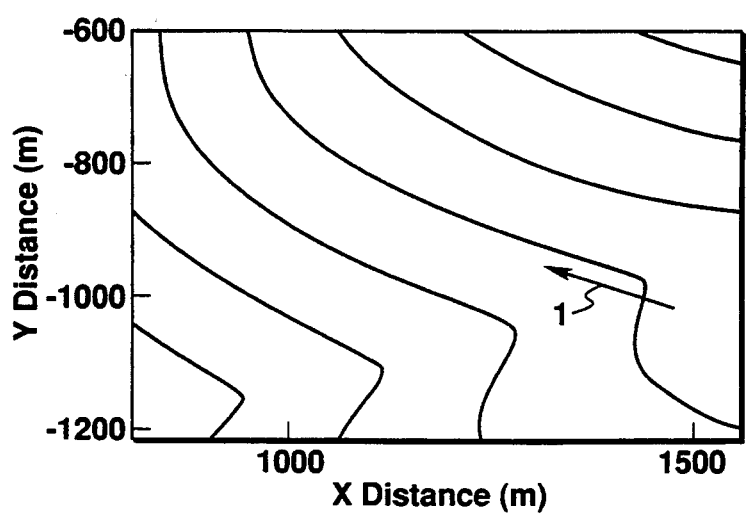
FIG. 4 contains a sketch of a turned wave 1.

This method performs radial extrapolation in the positive radius direction, so the radial component of the slowness vector may never attain a negative value ("backward propagating wavefronts"). See FIG. 4 for an explanation of backward propagating wavefronts, or "turned waves." The wave front propagating in direction 2 is propagating essentially in the radial direction. The turned wave front 1 is propagating almost entirely in the angular direction, which parallels the computation wave fronts. When the medium in which the wave is propagating is isotropic, the path of the wave is perpendicular to its corresponding wave fronts; therefore, turned waves occur where a wave front distorts so as to propagate completely in the angular directions, parallel to the computation fronts. Complicated velocity models, such as those containing salt structures, may cause wavefronts to turn back on the spherical computation fronts. When this happens, the adaptive radial step becomes zero, indicating that, theoretically, forward radial steps cannot be taken. It has been observed that usually this occurs as a result of headwave events, which are the type of event shown in FIG. 4. Traveltimes from these events are most likely not needed to image seismic reflection data because headwaves are not reflection events, which are what are imaged with migration methods, so for seismic imaging applications, this invention forces w, the radial component of the slowness vector, to always have a positive sign.

This is done with an adaptive angular normalization as follows: After $\bar{u}$ and $\bar{v}$ are extrapolated, the magnitude of the slowness vector is computed while assuming $w=0$. Then $\bar{u}$ and $\bar{v}$ are normalized so that w will be set to zero if and only if the current states of $\bar{u}$ and $\bar{v}$ imply that w should be negative; i.e., that the radical in the eikonal equation for w has a negative argument. Written algorithmically, in vectorizable fashion, this adaptive normalization procedure is:

$$p = \left( \bar{u}(r+\Delta r,\theta,\phi)^2 + \frac{\bar{v}(r+\Delta r,\theta,\phi)^2}{\sin^2\theta} \right)^{\frac{1}{2}} \quad (41)$$

$$p = \max[p,\epsilon] \quad (42)$$

$$q = \min[S(r+\Delta r,\theta,\phi)(1-\epsilon)/p, 1.0] \quad (43)$$

$$\bar{u}(r+\Delta r,\theta,\phi) = \bar{u}(r+\Delta r,\theta,\phi)q \quad (44)$$

$$\bar{v}(r+\Delta r,\theta,\phi) = \bar{v}(r+\Delta r,\theta,\phi)q \quad (45)$$

where $\epsilon$ is a small positive number, as discussed earlier. The invention also implements a minimum allowed adaptive radial step as $\Delta r_{min} = M\Delta r_{max}$, where M is a number between 0 and 1, preferably between 0 and 0.5, and more preferably 0.1, which has been shown by experiment to give good results. This adaptive angular normalization allows computations to proceed after backward propagating wavefronts have been encountered. Testing with synthetic and real data indicates that this procedure does not distort the traveltimes that are needed to image seismic reflection data.

This three dimensional traveltime calculation can be used to compute traveltimes necessary to perform integral-type depth migration, as already mentioned. Velocity analysis must be performed before the migration is performed. Migration and velocity analysis may be combined, forming an iterative pair that allows concurrent velocity analysis and imaging. Since velocity analysis methods may incorporate migration techniques or traveltime information this three dimensional traveltime calculation method is applicable to velocity analysis procedures also. Some of these velocity analysis methods are referred to in the art as tomography or velocity inversion methods, and they rely heavily upon traveltime information.

Volumes of traveltimes are also useful for computing and analyzing ray paths and wave fronts, which assist the seismic interpreter in understanding wave propagation in complex geologic media. Rays may easily be computed numerically from a three dimensional traveltime grid as they define the family of curves that are everywhere parallel to the traveltime gradient. Wavefronts may easily be computed numerically by computing isochron surfaces within the traveltime volume, a technique known to those of ordinary skill in the art. Graphics-capable computer workstations are especially useful for displaying rays and wave fronts for visual analysis. Therefore the three dimensional traveltime calculation method is applicable to ray tracing and wavefront diagram construction.

The three dimensional traveltime calculation method described herein assumes an isotropic medium. However, the algorithm may be extended to handle an anisotropic medium. The methodology for doing this is contained in Dellinger, "Anisotropic Finite-Difference Traveltimes," 61st annual International Meeting, Society of Exploration Geophysicists, Expanded Abstracts, 1991, pp. 1530–1533. This paper extends the Van Trier and Symes original two dimensional method to handle anisotropy. The applications of anisotropic earth traveltimes parallel those described previously for isotropic earth applications and are mandated whenever the isotropic assumption is invalid.

EXAMPLE

Figure 5:
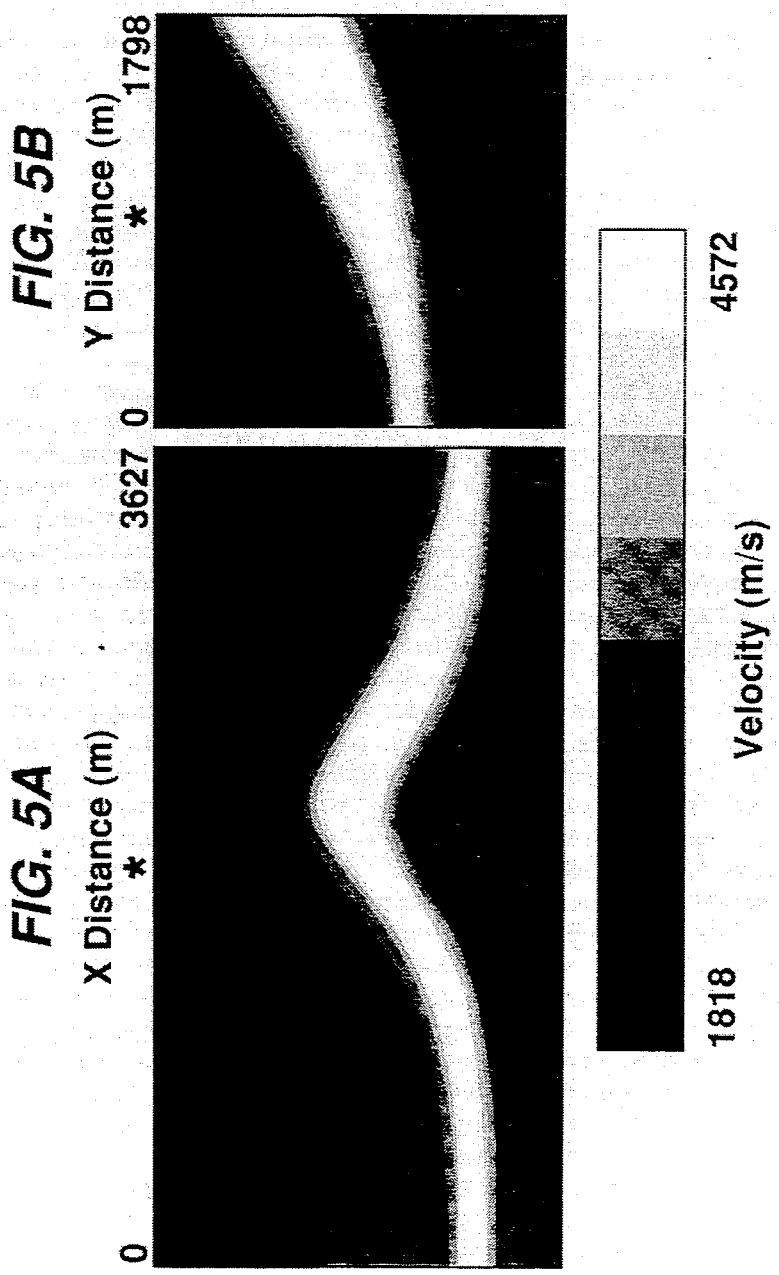
FIG. 5A is a vertical slice in the x direction through the model of the EXAMPLE.
FIG. 5B is a vertical slice in the orthogonal y direction through the model of the EXAMPLE.

A complicated three dimensional velocity model will be used to demonstrate this invention. The model contains a dipping, anticlinal salt structure that is embedded in a sediment package that contains mild lateral velocity variations. FIG. 5A shows a vertical slice through the model in the x direction and FIG. 5B shows a vertical slice in the orthogonal y direction, illustrating that the structure dips in the $-y$ direction with the anticlinal feature being oriented parallel to the x direction. The model was smoothed to suppress, by 20 dB, all wavenumbers greater than $$\frac{1}{2\Delta x}, \frac{1}{2\Delta y}, \text{ and } \frac{1}{2\Delta z}$$

in the x, y and z directions, respectively, where $\Delta x = \Delta y = \Delta z = 30.5$ m, and it was sampled at $\Delta x = \Delta y = \Delta z = 30.5$ m. The velocity grid contained 120 samples in the x direction and 60 samples in the y and z directions. The smoothing was the bare minimum necessary to remove aliased components at the chosen sampling.

Figure 6:
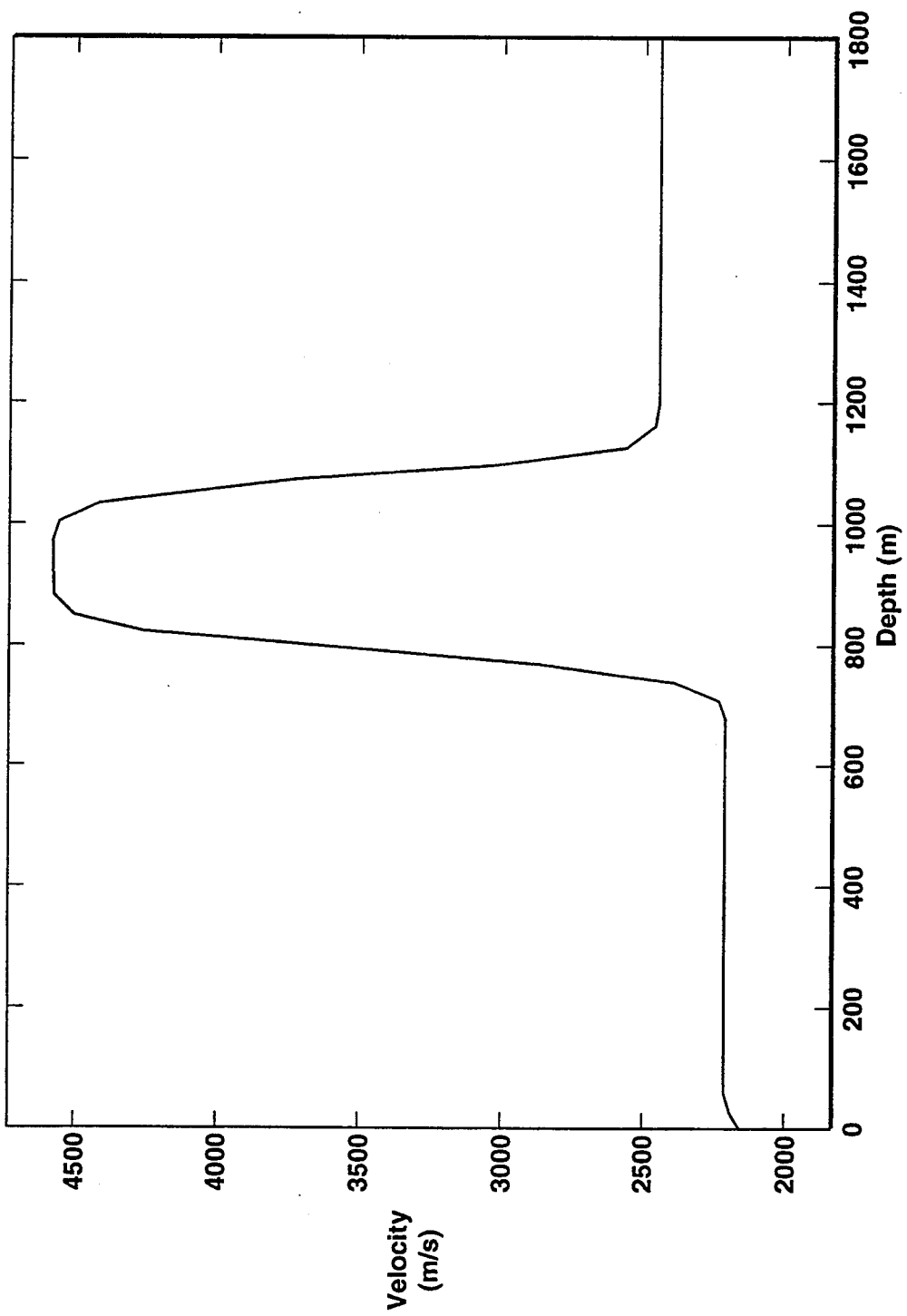
FIG. 6 shows the velocity variation with depth in the EXAMPLE directly below the source.

A source location was chosen at the top of the model, where the two slices intersect (shown as * on the slices in FIGS. 5A and 5B), and FIG. 6 shows the velocity variation with depth in the sampled model directly beneath this point. The model still contains most of is original dynamic range.

Figure 7:
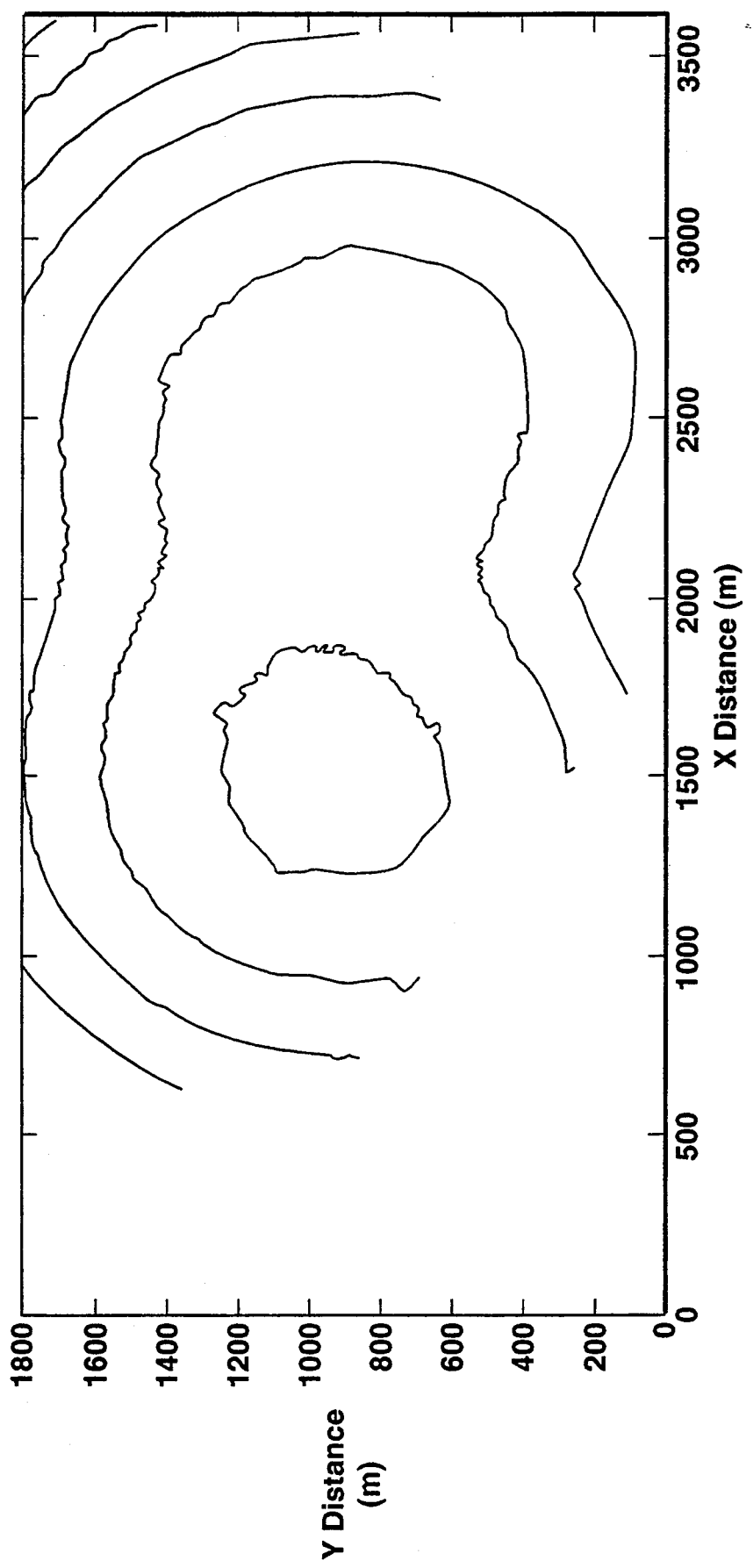
FIG. 7 shows the contoured traveltimes of the data of the EXAMPLE when using a conventional ray tracing method.

Using a standard Runge-Kutta integration of the three dimensional ray equations, a cone of rays from the source to the bottom (1798 m) of the model was traced. The ray locations and traveltimes at that depth were then extracted. FIG. 7 shows the contoured traveltimes. The model was not smooth enough to permit rays to travel far down the flanks of the salt structure (hence the blank zones at the edges), but the middle portion has been filled in. Also, since each ray is computed independently of its neighbors, local uncorrelated errors appear as jitter in the contours.

Figure 8:
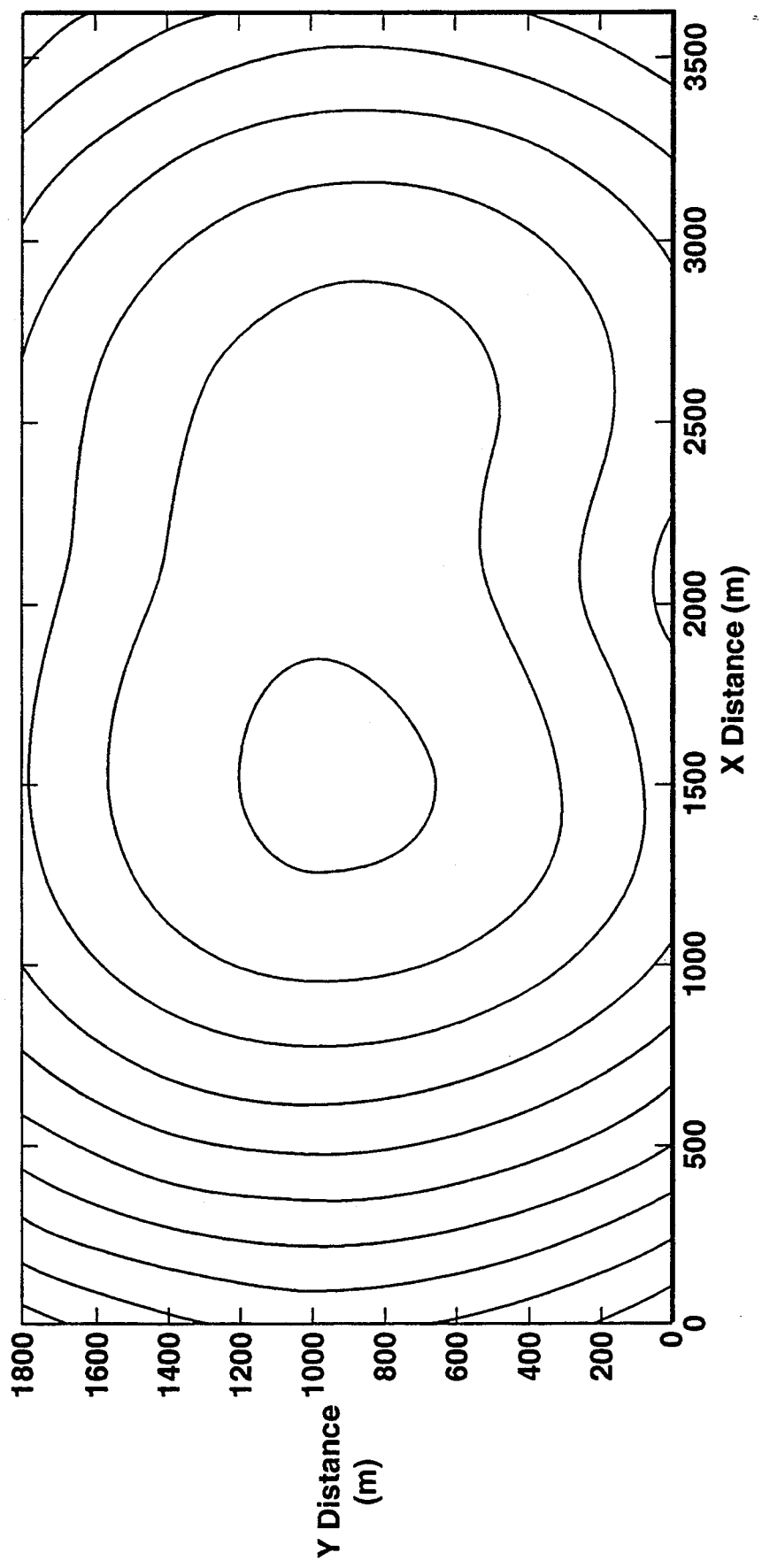
FIG. 8 shows the contoured traveltimes of the data of the EXAMPLE when using the method of this invention.
Figure 9:
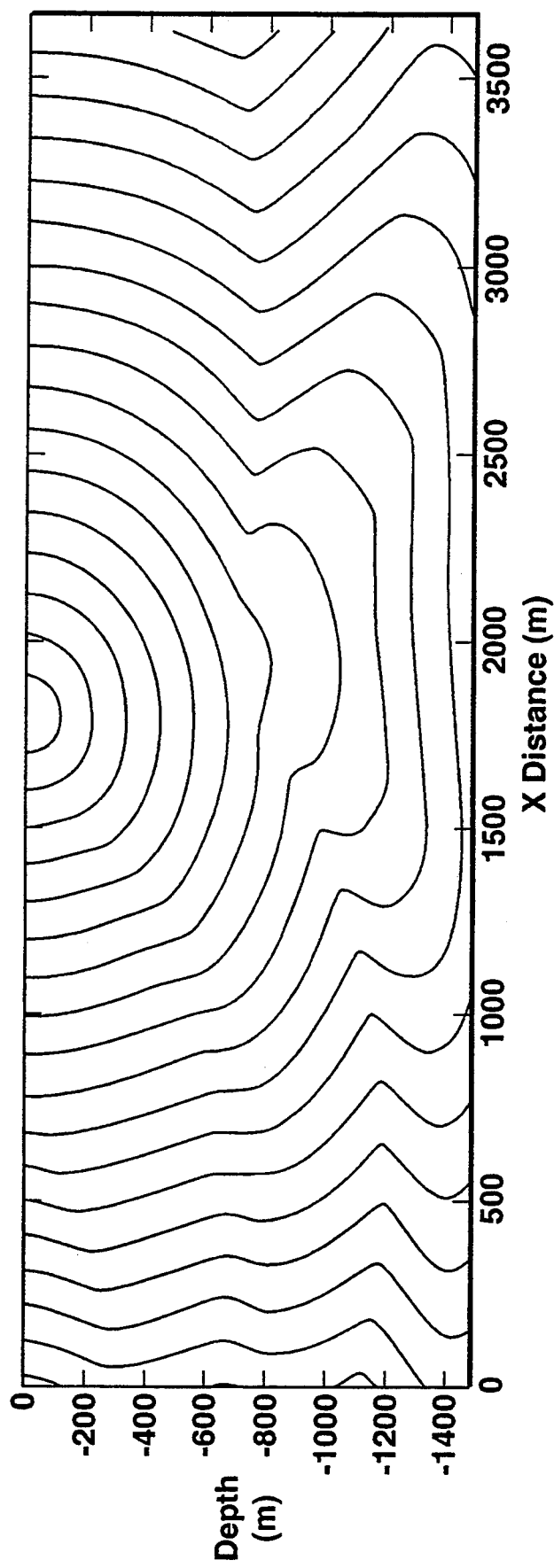
FIG. 9 shows a vertical slice from the traveltimegrid in the x direction for the EXAMPLE using the method of this invention.
Figure 10:
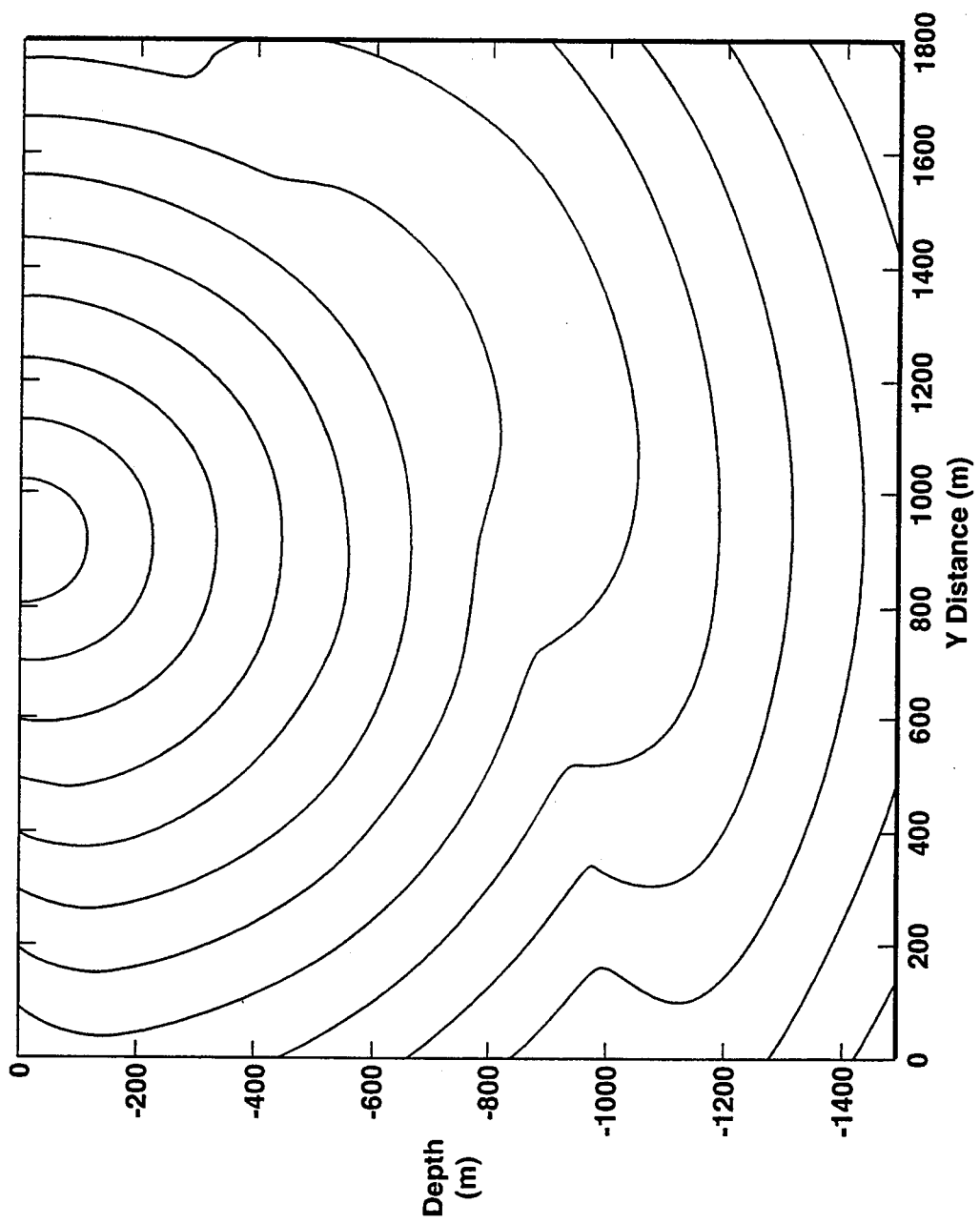
FIG. 10 shows a vertical slice from the traveltimegrid in the y direction for the EXAMPLE using the method of this invention.

The finite-difference traveltime calculation was used to generate a grid of times for the same source location. FIG. 8 shows the corresponding contoured traveltimes for the 1798 m depth slice. The contours coincide with those derived from ray tracing, establishing that the finite-difference traveltime method gave the correct times. This method has no trouble generating arrivals at all locations, unlike the ray tracing results depicted in FIG. 7, and it produces a smooth solution. The smoothness arises because all errors are correlated; each entity computed on the grid was derived from "nearest neighbors" which were computed on the previous radial step. FIGS. 9 and 10 show vertical slices from the finite-difference traveltime grid in the x and y directions respectively. These slices correspond exactly to the velocity slices shown in FIGS. 5A and 5B.

In FIG. 9, the wavefronts just left of and beneath the source flatten out in response to a local low velocity zone there (see FIGS. 5A and 5B). Note the complicated wavefronts and three dimensional propagation that occurred when the wavefronts encountered the salt layer.

This particular model is one that generates turned wavefronts, and the computation would have never completed (because this would have required the calculation of the square root of a negative number) if the adaptive angular normalization had not been performed. Headwaves propagating off the salt were the culprits, visible in FIG. 9, which shows contoured upwind finite-difference traveltimes from the x-z plane.

What is claimed is:

1. A method of seismic exploration using the eikonal equation, which method comprises the steps of:
   a) recording seismic signals from said subsurface;
   b) estimating subsurface velocities or slownesses at a plurality of locations within said subsurface volume;
   c) arranging said velocities or slownesses into a three dimensional grid of velocities, which constitutes an input grid;
   d) applying to said input grid a finite difference solution of the eikonal equation in spherical coordinates, which solution contains unitless amplitude factors and which solution is performed using an adaptive radial step process to generate a three dimensional grid of traveltimes; and
   e) using said three dimensional grid of traveltimes to migrate said seismic signals.

2. The method as set forth in claim 1, wherein the axes of the spherical coordinate system are rotated so that the angular coordinates, $\theta = 0$ and $\pi$ and $\phi = 0$ and $\pi$, lie substantially along the surface of the earth.

3. The method as set forth in claim 1, wherein smoothness is ensured in the input grid by tapering the input grid so that its Fourier transform is attenuated by about 20 decibels at all wavenumbers greater than $1/\{2\Delta x\}$, $1/\{2\Delta y\}$ and $1/(2\Delta z)$ in the x, y and z directions respectively, wherein $\Delta x$, $\Delta y$ by and $\Delta z$ represent the closest grid spacings in the x, y and z directions respectively in said input grid.

4. The method as set forth in claim 2, wherein smoothness is ensured in the input grid by tapering the input grid so that its Fourier transform is attenuated by about 20 decibels at all wavenumbers greater than $1/\{2\Delta x\}$, $1/\{2\Delta y\}$ and $1/\{2\Delta z\}$ in the x, y and z directions respectively, wherein $\Delta x$, $\Delta y$ by and $\Delta z$ represent the closest grid spacings in the x, y and z directions respectively in said input grid.

5. The method of claim 1, wherein any impact of backward propagating wavefronts is minimized by enforcing that any change in a traveltime being calculated with respect to any change in radial distance from the source is always greater than zero and by implementing a minimum allowed radial step of at least about one-tenth of the value of the closest grid spacing, in the x, y or z direction, in the input grid.

6. The method of claim 2, wherein any impact of backward propagating wavefronts is minimized by enforcing that any change in the traveltime with respect to any change in radial distance from the source is always greater than zero and by implementing a minimum allowed radial step of at least about one-tenth of the value of the closest grid spacing, in the x, y or z direction, in the input grid.

7. The method of claim 1, wherein the finite difference computation is required never to be more coarsely sampled than is the input grid.

8. The method of claim 2, wherein the finite difference computation is required never to be more coarsely sampled than is the input grid.

9. A method of seismic exploration using the eikonal equation, which method comprises the steps of:
   a) estimating subsurface velocity at a plurality of locations within said subsurface volume;
   b) arranging said velocities at a plurality of locations into a three dimensional grid of velocities;
   c) selecting a source location in, or on a surface defining a boundary of, said subsurface volume, the velocity of which source location is to be estimated;
   d) selecting a three-dimensional portion of said subsurface volume, and defining a traveltime grid into which traveltimes are to be saved, which traveltime grid contains all or part of said velocity grid;

e) using a set of equations setting forth finite-difference version of the three dimensional eikonal equation in spherical coordinates, which finite difference version uses radial steps;

f) using an adaptive radial step process which adaptively restricts the radial steps used in the finite-difference computation so that any domain of dependence of the finite-difference equations will not be smaller than any domain of dependence of the differential equations that they approximate, which adaptive radial step process yields an optimal incremental radial step;

g) using said optimal incremental radial step in performing a finite-difference extrapolation to generate a three dimensional grid of traveltimes; and h) using said three dimensional grid of traveltimes to migrate said seismic signals.

10. The method as set forth in claim 9, wherein the axes of the spherical coordinate system are rotated so that the angular coordinates, $\theta=0$ and $\pi$ and $\phi=0$ and $\pi$, lie substantially along the surface of the earth.

11. The method as set forth in claim 9, wherein smoothness is ensured in the input grid by tapering the input grid so that its Fourier transform is attenuated by about 20 decibels at all wavenumbers greater than $1/\{2\Delta x\}$, $1/\{2\Delta y\}$ and $1/\{2\Delta z\}$ in the x, y and z directions respectively, wherein $\Delta x$, $\Delta y$ and $\Delta z$ represent the closest grid spacings in the x, y and z directions respectively in said input grid.

12. The method of claim 9, wherein the impact of backward propagating wavefronts is minimized by enforcing that the change in the traveltime with respect to the change in radial distance from the source is always greater than zero and by implementing a minimum allowed radial step of at least about one-tenth of the value of the closest grid spacing, in the x, y or z direction, in the input grid.

13. The method of claim 9, wherein the finite difference computation is required never to be more coarsely sampled than is the input grid.

14. Apparatus for seismic exploration using the eikonal equation, which apparatus comprises:

a) means for estimating subsurface velocities at a plurality of locations within said subsurface volume;

b) means for arranging said velocities into a three dimensional grid of velocities;

c) means for using a finite difference solution of the eikonal equation in spherical coordinates, which solution contains unitless amplitude factors and which solution is performed using an adaptive radial step process to generate a three dimensional grid of traveltimes; and d) means for using said three dimensional grid of traveltimes to migrate said seismic signals.

15. The apparatus as set forth in claim 14, including means for rotating the axes of the spherical coordinate system so that the angular coordinates, $\theta=0$ and $\pi$ and $\phi=0$ and $\pi$, lie substantially along the surface of the earth.

16. An apparatus for seismic exploration using the eikonal equation, which apparatus comprises:

a) means for estimating subsurface velocity at a plurality of locations within said subsurface volume;

b) means for arranging said velocities at a plurality of locations into a three dimensional grid of velocities;

c) means for selecting a source location selected from the group consisting of those locations within said subsurface volume and on a surface defining a boundary of said subsurface volume, the velocity of which source location is to be estimated;

d) means for selecting a three-dimensional portion of said subsurface volume, and defining a traveltime grid into which traveltimes are to be saved, which traveltime grid contains at least part of said velocity grid;

e) means for using a set of equations setting forth a finite-difference version of the three dimensional eikonal equation in spherical coordinates;

f) means for using an adaptive radial step process which adaptively restricts any radial steps used in the finite-difference computation so that any domain of dependence of the finite-difference equations will not be smaller than any domain of dependence of the differential equations that they approximate;

g) means for using said optimal incremental radial step in performing a finite-difference extrapolation to generate a three dimensional grid of traveltimes; and h) means for using said three dimensional grid of traveltimes to migrate said seismic signals.

17. A computer-implemented method for migrating seismic signals from a subsurface volume of the earth using the eikonal equation, said method comprising the steps of:

(a) using said seismic data to estimate subsurface seismic velocities at a plurality of locations within said subsurface volume of earth;

(b) arranging said subsurface seismic velocities into a three-dimensional grid of velocities in rectangular coordinates;

(c) inputting said three-dimensional grid of velocities into a computer and using said computer to generate a three-dimensional grid of traveltimes in spherical coordinates therefrom, said three dimensional grid of traveltimes being generated by applying to said three-dimensional grid of velocities a finite difference solution of the eikonal equation in spherical coordinates, which solution contains unitless amplitude factors and is performed using an adaptive radial step process; and (d) using said three-dimensional grid of traveltimes to migrate said seismic signals.

* * * * *